Feb. 25, 1958 F. KOSS, JR 2,824,363
WELDING POINT EXTRACTOR
Filed Oct. 27, 1953 2 Sheets-Sheet 1
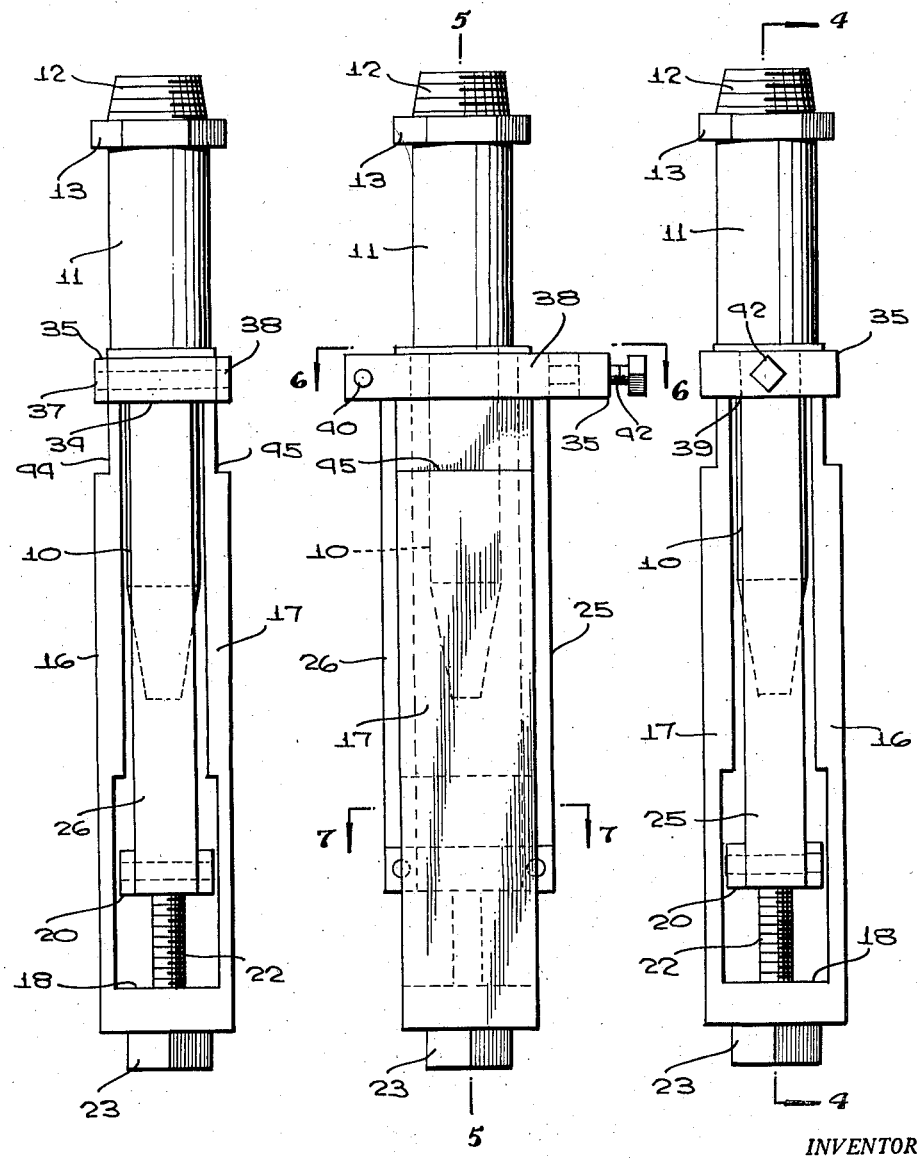
INVENTOR.
Frank Koss, Jr.

Feb. 25, 1958 F. KOSS, JR 2,824,363
WELDING POINT EXTRACTOR
Filed Oct. 27, 1953 2 Sheets-Sheet 2
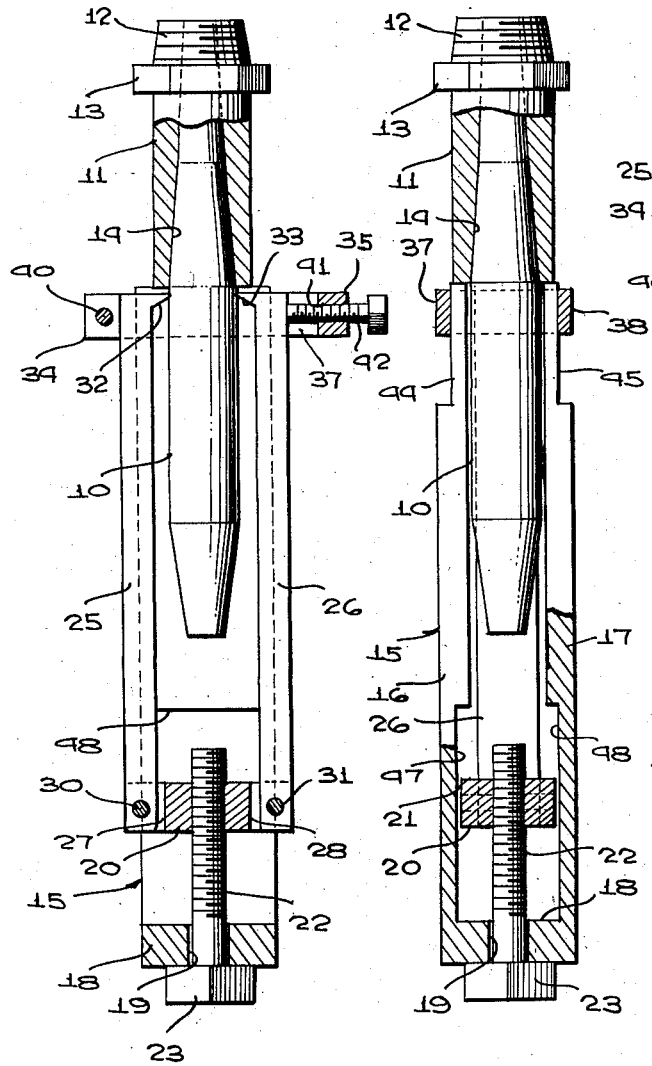
Fig. 4
Fig. 5
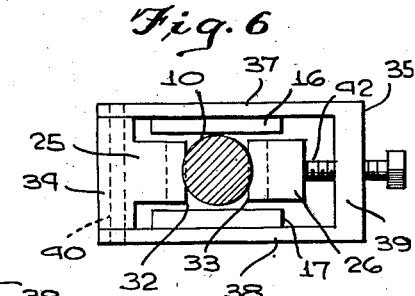
Fig. 6
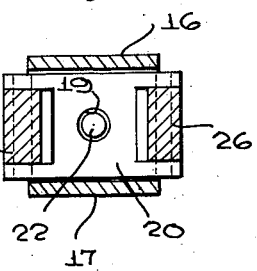
Fig. 7
INVENTOR.
Frank Koss, Jr.
BY
McMorrow, Berman + Davidson
ATTORNEYS United States Patent Office 2,824,363
Patented Feb. 25, 1958

2,824,363

WELDING POINT EXTRACTOR

Frank Koss, Jr., Tecumseh, Ontario, Canada

Application October 27, 1953, Serial No. 388,592

1 Claim. (Cl. 29—261)

This invention relates to extractors for removing objects from sockets or receptacles in which the objects are mounted, and more particularly to an extractor for removing worn welding points from the welding point sockets or adapters of a welding machine.

It is among the objects of the invention to provide an improved extractor to be engaged with a welding point and its socket or adapter of a welding machine and operated to exert sufficient pressure between the welding point and the welding point socket or adapter to pull the welding point out of the socket; which can withdraw a welding point from a welding point adapter with no damage to the adapter; which is adapted for use with welding points of different lengths and diameters; and which is effective and efficient in use and easy to operate.

Other objects and advantages will become apparent from a consideration of the following description in conjunction with the accompanying drawings wherein:

Figure 1 is an edge elevational view of a welding point extractor illustrative of the invention shown in operative association with a welding point and welding point adapter;

Figure 2 is a side elevational view taken at right angles to Figure 1;

Figure 3 is an edge elevational view of the opposite edge of the extractor from that illustrated in Figure 1;

Figure 4 is a longitudinal cross sectional view on the line 4—4 of Figure 3;

Figure 5 is a longitudinal cross sectional view on the line 5—5 of Figure 2;

Figure 6 is a transverse cross sectional view on the line 6—6 of Figure 2; and

Figure 7 is a transverse cross sectional view on the line 7—7 of Figure 2.

With continued reference to the drawings, the numeral 10 designates a welding point, such as is used in a spot welding machine, comprising an elongated cylindrical body having tapered end portions, the point being formed of a suitable material, such as compressed graphite or a metallic alloy. The numeral 11 designates a point adapter or socket comprising a cylindrical body having at one end a tapered, externally screw threaded wrench portion 12, a portion 13 of polygonal shape at the inner end of the screw threaded portion 12, and a flared bore 14 centrally therethrough providing a socket at one end, remote from the portion 12, receiving one of the tapered end portions of the welding point 10. The bore 14 through the adapter 11 permits circulation of water to the welding point to keep it cool.

When a welding machine is used, the forward or working ends of the welding points are pressed against the work pieces with such force that the points are driven into the associated sockets so tightly that it is difficult to remove the points from the sockets and the points are gradually worn off at their forward ends. When a point has been worn to a predetermined extent, it becomes necessary to remove the point from the associated socket or adapter and either recondition the welding point or replace it with a new one. The extractor of the present invention is provided for removing such worn welding points from the associated adapters without damage to the adapters.

The illustrated extractor comprises a frame, generally indicated at 15, of somewhat U shape having a bight portion 18 and a pair of elongated flat legs 16 and 17 disposed in spaced apart and parallel relationship to each other with the space therebetween substantially equal to the outside diameter of the cylindrical portion of the welding point 10, this space being sufficient to receive welding points of the largest diameter for which the extractor is designed. The legs are also materially longer than the welding points to be accommodated. The bight portion 18 is provided with a central bore 19.

A block 20 of rectangular shape is disposed between the frame legs 16 and 17 adjacent the bight portion 18 and is provided with a central threaded bore 21. A screw 22 extends rotatably through the bore 19 in the bight portion 18 and is threaded through the bore 21 in the block 20 and has on its rear end a head 23 bearing against the rear side of the bight portion 18 to render the screw effective to pull the block 20 toward the bight portion 18 when the screw is rotated in a predetermined direction.

A pair of elongated straight jaw bars 25 and 26, shorter and narrower than the legs 16 and 17, are disposed at opposite sides of and between the legs 16 and 17 and extend longitudinally of the frame 15 in opposed relationship to each other. The block 20 is provided on opposite sides thereof with pairs of spaced ears 27 and 28, and the rear ends of the jaw bars 25 and 26 are engaged between the pairs of ears. The pairs of ears 27 and 28 are traversed by pivot pins 30 and 31 extending through the rear ends of the jaw bars. At their forward ends the jaw bars are provided on their inner sides with laterally inwardly projecting jaws 32 and 33. The forward end of the jaw bar 25 is provided on its laterally outward side with a transversely elongated lug 34, the end portions of which extend laterally outwardly from opposite sides of the jaw bar 25.

A U-shaped clamp frame 35 having straight and substantially parallel legs 37 and 38, and a bight portion 39 embraces the jaw bar 26 and the frame side legs 16 and 17 and receives the lug 34 between the free ends of its legs 37 and 38. A pivot pin 40 extends through the lug 34 and through the free ends of the legs 37 and 38 so as to hinge the clamp frame 35 on the frame leg 25.

The bight portion 39 of the clamp frame 35 is provided with a central threaded hole 41 and a set screw 42 is threaded through the hole 41 and bears at its inner end against the outer side of the jaw bar 26 to force the jaws 32 and 33 toward each other and engage the jaws with diametrically opposite sides of a welding point 10, as illustrated in Figure 4.

The forward end portions of the outer sides of the frame legs 16 and 17 are cut away to provide seats 44 and 45 (Fig. 5), to receive the inner faces of the legs 37 and 38 of the clamp frame 35, so that there is a close sliding fit between the inner faces of legs 16 and 17 and the respective seats 44 and 45, providing lateral support for the frame legs 16 and 17 which prevents their spreading apart and slipping off the end of the adapter 11 as the screw 22 is rotated in a predetermined direction and presses the forward ends of the legs 16 and 17 against the adjacent end of the adapter.

The inner sides of the frame legs 16 and 17 near the bight portion 18 are cut away to provide longitudinal recesses 47 and 48 which slidably receive opposite sides of the block 20 and prevent rotation of the block 20 relative to the frame 15 when the screw 22 is rotated.

In the use of the device, the extractor is inserted onto the projecting portion of a welding point 10, so that the welding point is disposed between the frame legs 16 and 17 and the ends of the frame legs remote from the block 18 bear against the adjacent or outer end of the associated welding point adapter 11. The welding point will now be disposed between the detents 32 and 33 of the jaw members 16 and 17 and the set screw 42 is now turned in a direction to force the detent carrying ends of the jaws together and to cause the sharpened, opposed edges of the detent formations to bite into the welding point at the outer end of the welding point adapter. After the jaw detents have been firmly engaged with the welding point, the screw 22 is rotated in a direction to first bring the head 23 of the screw against the outer side of the block 18 and to then thread the screw through the nut 20 in a direction to draw the nut toward the block 18 and thereby move the jaws 25 and 26 inwardly of the end of the frame bearing against the welding point adapter. The screw 22 exerts a sufficient force between the welding point and the associated adapter to pull the welding point out of the adapter socket and this is accomplished without damage to the adapter, since the only force exerted on the adapter is the pressure of the flat ends of the frame legs against the flat outer end surface of the adapter.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

A device for extracting a welding point from an adapter on which the point is secured, comprising a U-shaped main frame having a bight portion having a rear side and substantially parallel spaced legs having forward ends, said bight portion having a central bore therethrough, a screw having a shank extending rotatably and forwardly through said bore and a head on the shank bearing against the rear side of the bight portion, a rectangular block positioned between the frame legs forwardly of the bight portion and threaded on said screw shank, said block having opposite sides bearing against the frame legs, said block having other opposite sides having projections thereon, a pair of elongated jaw bars having rear ends and forward ends, said jaw bars being positioned along opposite sides of and between the frame legs with their rear ends pivoted on related block projections, said jaw bars having inner sides and outer sides, jaws on the inner sides of the jaw bars at their forward ends for gripping opposite sides of a welding point disposed between the jaw bars and between the frame legs, one of said jaw bars having a lug on its outer side at its forward end, a U-shaped clamp frame having a bight portion and parallel spaced legs having free ends, said clamp frame having its legs slidably engaged with the outer sides of the frame legs near the forward ends of the main frame legs and having the free ends of its legs pivoted on said lug, with the bight portion of the clamp frame spaced outwardly from the outer side of the other of said jaw bars, and a set screw threaded through the bight portion of the clamp frame and bearing against the outer side of the said other jaw bar, the forward ends of the main frame legs being arranged to engage the adapter in opposition to the pull of the jaws on the welding point as said screw is rotated in a direction to move said block toward the bight portion of the main frame.

References Cited in the file of this patent

UNITED STATES PATENTS

| | | |
|---|---|---|
| 192,734 | Broadbent | July 3, 1877 |
| 1,425,836 | Campbell | Aug. 15, 1922 |
| 1,601,752 | Wortham | Oct. 5, 1926 |
| 1,746,280 | Quint | Feb. 11, 1930 |
| 1,827,475 | Keefer | Oct. 13, 1931 |